United States Patent
Matthews

(10) Patent No.: US 9,185,015 B2
(45) Date of Patent: Nov. 10, 2015

(54) APPLICATION AWARE ELEPHANT FLOW IDENTIFICATION

(71) Applicant: Broadcom Corporation, Irvine, CA (US)

(72) Inventor: William Brad Matthews, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 142 days.

(21) Appl. No.: 13/842,319

(22) Filed: Mar. 15, 2013

(65) Prior Publication Data

US 2014/0233421 A1    Aug. 21, 2014

Related U.S. Application Data

(60) Provisional application No. 61/766,479, filed on Feb. 19, 2013.

(51) Int. Cl.
*H04L 12/28* (2006.01)
*H04L 12/26* (2006.01)
*H04L 12/931* (2013.01)

(52) U.S. Cl.
CPC .......... *H04L 43/0888* (2013.01); *H04L 43/026* (2013.01); *H04L 43/028* (2013.01); *H04L 49/35* (2013.01); *H04L 49/355* (2013.01)

(58) Field of Classification Search
CPC ..... H04L 43/0888; H04L 47/12; H04L 47/10; H04L 47/11; H04L 49/355; H04L 12/801
USPC ......... 370/230–235, 252, 241, 253, 351, 352, 370/395.2, 395.4, 389, 391, 392, 396, 400; 726/2–4, 11, 12, 13, 14, 22, 23, 24, 726/27–30; 709/213, 220, 223, 227, 238, 709/240
See application file for complete search history.

(56) References Cited

U.S. PATENT DOCUMENTS

| | | | | |
|---|---|---|---|---|
| 7,808,898 B2 * | 10/2010 | Eswaran et al. | ............... | 370/230 |
| 8,037,175 B1 * | 10/2011 | Apte et al. | ..................... | 709/224 |
| 8,644,311 B2 * | 2/2014 | Cheng et al. | .................. | 370/390 |
| 8,730,819 B2 * | 5/2014 | Liu et al. | ........................ | 370/241 |
| 2010/0232426 A1 * | 9/2010 | Oman | ........................... | 370/389 |
| 2014/0237118 A1 * | 8/2014 | Matthews | ..................... | 709/226 |

* cited by examiner

Primary Examiner — Hanh N Nguyen
(74) Attorney, Agent, or Firm — Brinks Gilson & Lione

(57) ABSTRACT

A network device identifies elephant flows. The network device filters received network data according to an application-specific criteria and identifies the elephant flow from the filtered network data. To do so, the network device can employ a multi-stage filtering process to identify an elephant flow in the received network data. The network device separates the filtered network data into multiple macroflows using a first hash function, and identifies the macroflow with the highest rate. Then, the network device disaggregates the high rate macroflow into multiple microflows using a second hash function and identifies the highest rate microflow as the elephant flow. The network device maintains an elephant flow cache with entries for currently identified elephant flows. The network device may also take management actions on the elephant flows, and the management actions may be application specific.

20 Claims, 12 Drawing Sheets

APPLICATION AWARE ELEPHANT FLOW IDENTIFICATION

PRIORITY CLAIM

This application claims priority to U.S. Provisional Application Ser. No. 61/766,479, filed Feb. 19, 2013, titled "Application Aware Elephant Flow Identification," which is incorporated herein by reference in its entirety.

TECHNICAL FIELD

This disclosure relates to networking. This disclosure also relates to identification and management of large application-specific network traffic flows.

BACKGROUND

High speed data networks form part of the backbone of what has become indispensable worldwide data connectivity. Within the data networks, network devices such as switching devices direct data packets from source ports to destination ports, helping to eventually guide the data packets from a source to a destination. Improvements in identifying and managing of high volume network flows will help improve high speed data networks.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to flows. A flow (or traffic flow, packet flow, or dataflow) may refer to a stream of network data communicated between a source and a destination. A flow may be communicated according to any communication protocol, including as a Transmission Control Protocol (TCP) flow or as a User Datagram Protocol (UDP) flow, as examples.

The discussion below also makes reference to elephant flows. An elephant flow may refer to a flow of network packets that meets one or more predetermined flow characteristics. For example, the flow characteristics may include that the elephant flow consumes more than a specified volume threshold of network traffic, or occupies more than a bandwidth threshold of bandwidth through a particular network device, or over a specified portion of a path through a network over a period of time. Many other characteristics may be established for determining that a network flow is an elephant flow. For instance, an elephant flow may refer to a flow that exceeds a rate threshold, a volume threshold, and/or a duration threshold either in absolute terms or as compared to other flows communicated through a network or that travel through a network device. These thresholds, or any other specified elephant flow thresholds, can be configurable parameters that a network device can apply to determine whether a flow is an elephant flow, for example. An elephant flow may also refer to a flow that consumes a bandwidth amount or link capacity that exceeds a predetermined threshold, e.g., a flow that consumes more than 20% of the bandwidth capacity of a link in a network device. As another example, in a distribution of flows communicated across a network link or through a particular network device, and plotted according to flow size and/or rate, elephant flows may refer to the top portion of the distribution of the flows, such as the top 10 flows, the top 10 percent of flows, the flows consuming a determined portion of the bandwidth or link capacity of a network device, the top flows carrying at least a predetermined amount of data, or according to other metrics. As a matter of terminology, an elephant flow may also be referred to as a jumbo flow or a giant flow.

The discussion below first provides an exemplary architecture of a network device for identifying and managing elephant flows. Then, elephant flow identification is presented in greater detailed followed by discussion of management of identified elephant flows.

Example Architecture

Figure 1:
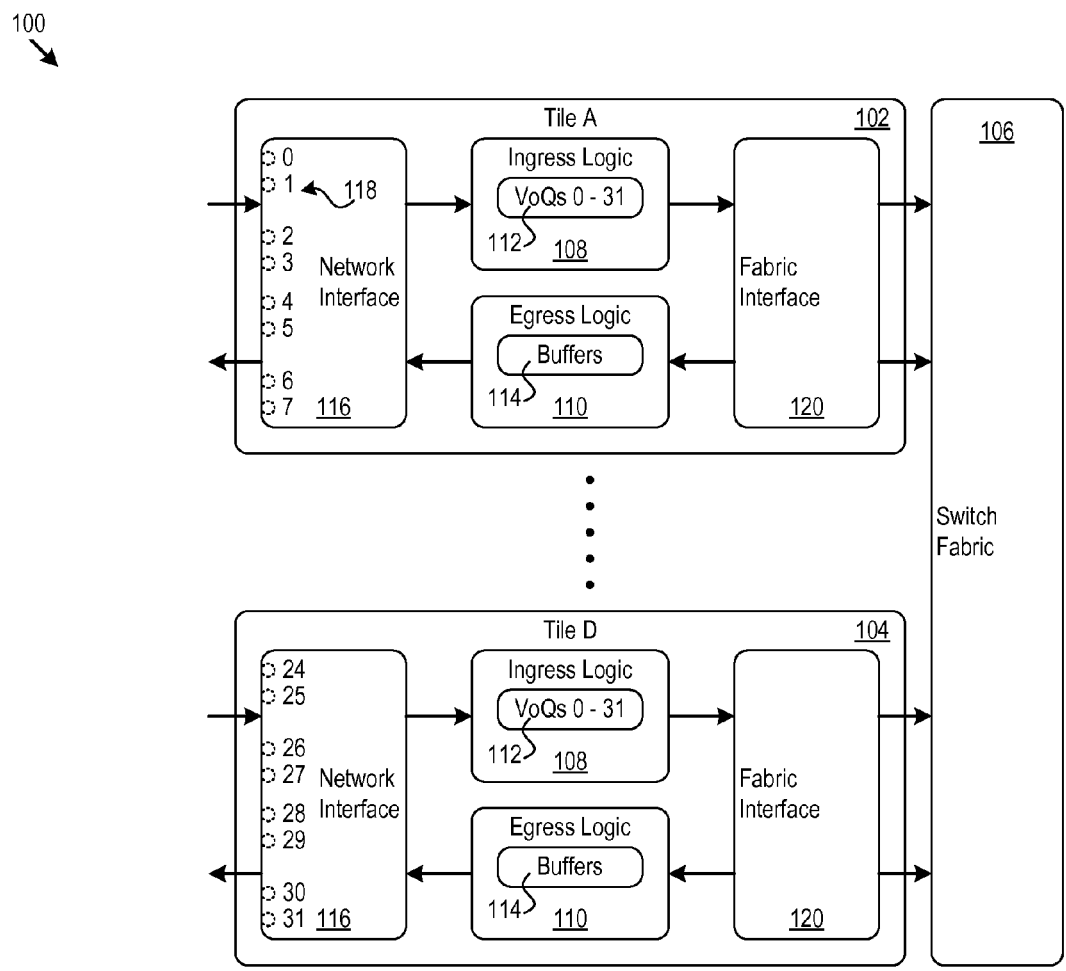
FIG. 1 shows an example of a switch architecture that may include elephant flow identification and elephant flow management functionality.

FIG. 1 shows an example of a switch architecture 100 that may include elephant flow identification and elephant flow management functionality. The description below provides a backdrop and a context for the explanation of elephant flow identification and management, which follows the example architecture description. The example switch architecture 100 is presented as just one of many possible network device architectures that may include elephant flow identification and/or elephant flow management functionality, and the example provided in FIG. 1 is one of many different possible alternatives. The techniques described further below are not limited to any specific device architecture.

The architecture 100 includes several tiles, e.g., the tiles specifically labeled as tile A 102 and the tile D 104. In this example, each tile has processing logic for handling packet ingress and processing logic for handling packet egress. A switch fabric 106 connects the tiles. Packets, sent for example by source network devices such as application servers, arrive at the network interfaces 116. The network interfaces 116 may include any number of physical ports 118. The ingress logic 108 buffers the packets in memory buffers. Under control of the switch architecture 100, the packets flow from an ingress tile, through the fabric interface 120 through the switching fabric 106, to an egress tile, and into egress buffers in the receiving tile. The egress logic sends the packets out of specific ports toward their ultimate destination network device, such as a destination application server.

Each ingress tile and egress tile may be implemented as a unit (e.g., on a single die or system on a chip), as opposed to physically separate units. Each tile may handle multiple ports, any of which may be configured to be input only, output only, or bi-directional. Thus, each tile may be locally responsible for the reception, queuing, processing, and transmission of packets received and sent over the ports associated with that tile.

As an example, in FIG. 1 the tile A 102 includes 8 ports labeled 0 through 7, and the tile D 104 includes 8 ports labeled 24 through 31. Each port may provide a physical interface to other networks or network devices, such as through a physical network cable (e.g., an Ethernet cable). Furthermore, each port may have its own line rate (i.e., the rate at which packets are received and/or sent on the physical interface). For example, the line rates may be 10 Mbps, 100 Mbps, 1 Gbps, or any other line rate.

The techniques described below are not limited to any particular configuration of line rate, number of ports, or number of tiles, nor to any particular network device architecture. Instead, the elephant flow identification and management techniques described below are applicable to any network device that incorporates the elephant flow logic described below. The network devices may be switches, routers, bridges, blades, hubs, or any other network device that handle routing packets from sources to destinations through a network. The network devices are part of one or more networks that connect, for example, application servers together across the networks. The network devices may be present in one or more data centers that are responsible for routing packets from a source to a destination.

The tiles include packet processing logic, which may include ingress logic 108, egress logic 110, elephant flow logic 202, and any other logic in support of the functions of the network device. The ingress logic 108 processes incoming packets, including buffering the incoming packets by storing the packets in memory. The ingress logic 108 may define, for example, virtual output queues 112 (VoQs), by which the ingress logic 108 maintains one or more queues linking packets in memory for the egress ports. The ingress logic 108 maps incoming packets from input ports to output ports, and determines the VoQ to be used for linking the incoming packet in memory. The mapping may include, as examples, analyzing addressee information in the packet headers, and performing a lookup in a mapping table that matches addressee information to output port(s).

The egress logic 110 may maintain one or more output buffers 114 for one or more of the ports in its tile. The egress logic 110 in any tile may monitor the output buffers 114 for congestion. When the egress logic 110 senses congestion (e.g., when any particular output buffer for any particular port is within a threshold of reaching capacity), the egress logic 110 may throttle back its rate of granting bandwidth credit to the ingress logic 108 in any tile for bandwidth of the congested output port. The ingress logic 108 responds by reducing the rate at which packets are sent to the egress logic 110, and therefore to the output ports associated with the congested output buffers.

The ingress logic 108 receives packets arriving at the tiles through the network interface 116. In the ingress logic 108, a packet processor may perform link-layer processing, tunnel termination, forwarding, filtering, and other packet processing functions on the received packets. The packets may then flow to an ingress traffic manager (ITM). The ITM writes the packet data to a buffer, from which the ITM may decide whether to accept or reject the packet. The ITM associates accepted packets to a specific VoQ, e.g., for a particular output port. The ingress logic 108 may manage one or more VoQs that are linked to or associated with any particular output port. Each VoQ may hold packets of any particular characteristic, such as output port, class of service (COS), priority, packet type, or other characteristic.

The ITM, upon linking the packet to a VoQ, generates an enqueue report. The elephant flow logic, described below, may receive the enqueue report as a signal that a new packet has arrived that may be a part of an identified elephant flow, and that may cause the elephant flow identification and/or management logic to specifically handle the packet, as described in greater detail below. The ITM may also send the enqueue report to an ingress packet scheduler. The enqueue report may include the VoQ number, queue size, and other information. The ITM may further determine whether a received packet should be placed on a cut-through path or on a store and forward path. If the receive packet should be on a cut-through path, then the ITM may send the packet directly to an output port with as low latency as possible as unscheduled traffic, and without waiting for or checking for any available bandwidth credit for the output port. The ITM may also perform packet dequeueing functions, such as retrieving packets from memory, forwarding the packets to the destination egress tiles, and issuing dequeue reports. The ITM may also perform buffer management, such as admission control, maintaining queue and device statistics, triggering flow control, and other management functions.

In the egress logic 110, packets arrive via the fabric interface 120. A packet processor may write the received packets into an output buffer 114 (e.g., a queue for an output port through which the packet will exit) in the egress traffic manager (ETM). Packets are scheduled for transmission and pass through an egress transmit packet processor (ETPP) and ultimately out of the output ports.

The ETM may perform, as examples: egress packet reassembly, through which incoming cells that arrive interleaved from multiple source tiles are reassembled according to source tile contexts that are maintained for reassembly purposes; egress multicast replication, through which the egress tile supports packet replication to physical and logical ports at the egress tile; and buffer management, through which, prior to enqueueing the packet, admission control tests are performed based on resource utilization (i.e., buffer and packet descriptors). The ETM may also perform packet enqueue/dequeue, by processing enqueue requests coming from the ERPP to store incoming frames into per egress port class of service (CoS) queues prior to transmission (there may be any number of such CoS queues, such as 2, 4, or 8) per output port.

The ETM may also include an egress packet scheduler to determine packet dequeue events, resulting in packets flowing from the ETM to the ETPP. The ETM may also perform egress packet scheduling by arbitrating across the outgoing ports and COS queues handled by the tile, to select packets for transmission; flow control of egress credit scheduler (ECS), by which, based on total egress tile, per egress port, and per egress port and queue buffer utilization, flow control is sent to the ECS to adjust the rate of transmission of credit grants (e.g., by implementing an ON/OFF type of control over credit grants); flow control of tile fabric data receive, through which, based on total ETM buffer utilization, link level flow control is sent to the fabric interface 120 to cease sending any traffic to the ETM.

Elephant Flow Identification

Figure 2:
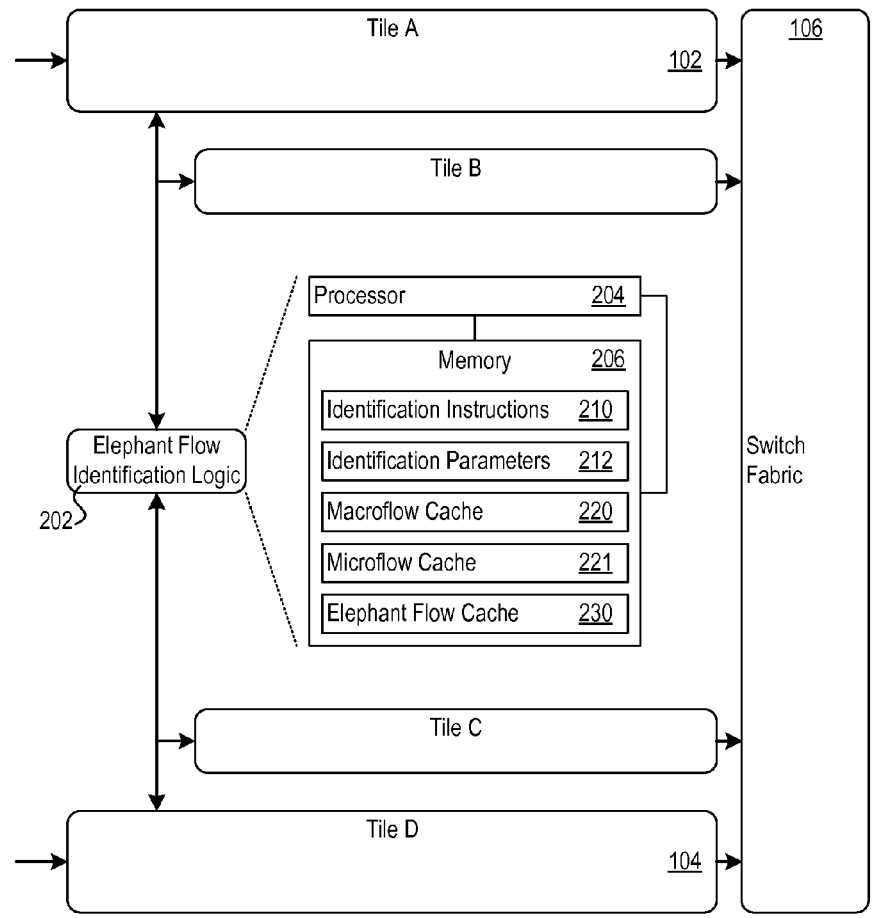
FIG. 2 is an example switch architecture extended to include elephant flow identification logic.

FIG. 2 shows an example switch architecture 200 which is extended to include elephant flow identification logic 202.

The elephant flow identification logic 202 may be implemented in any combination of hardware, firmware, or software. The elephant flow identification logic may be implemented at any one or more points in the architecture 100, or in other architectures of any network device. As examples, the elephant flow identification logic 202 may be a separate controller or processor/memory subsystem. As other examples, the elephant flow identification logic 202 may be incorporated into, and share the processing resources of the ingress logic 108, egress logic 110, fabric interfaces 120, network interfaces 116, or switch fabric 106.

In the example of FIG. 2, the elephant flow identification logic 202 includes a processor 204 and a memory 206. In some implementations, the memory 206 stores identification instructions 210, identification parameters 212, a macroflow cache 220, a microflow cache 221, and an elephant flow cache 230. The processor 204 executes the identification instructions 210 to identify one or more elephant flows in network traffic (e.g., packets in a network flow) received by the switch architecture 200. As described in greater detail below, the elephant flow identification logic 202 can filter received network data according any number criteria specified in the identification parameters 212, including on an application specific basis. Upon filtering the network packets, the elephant flow identification logic 202 may execute, for example, a one stage or multi-stage identification process. The identification process may employ the macroflow cache 220 and microflow cache 221 to identify one or more elephant flows. The elephant flow cache 230 stores entries for identified elephant flows, which can include buffered elephant flow packet data and/or other identifying information of the elephant flow.

Figure 3:
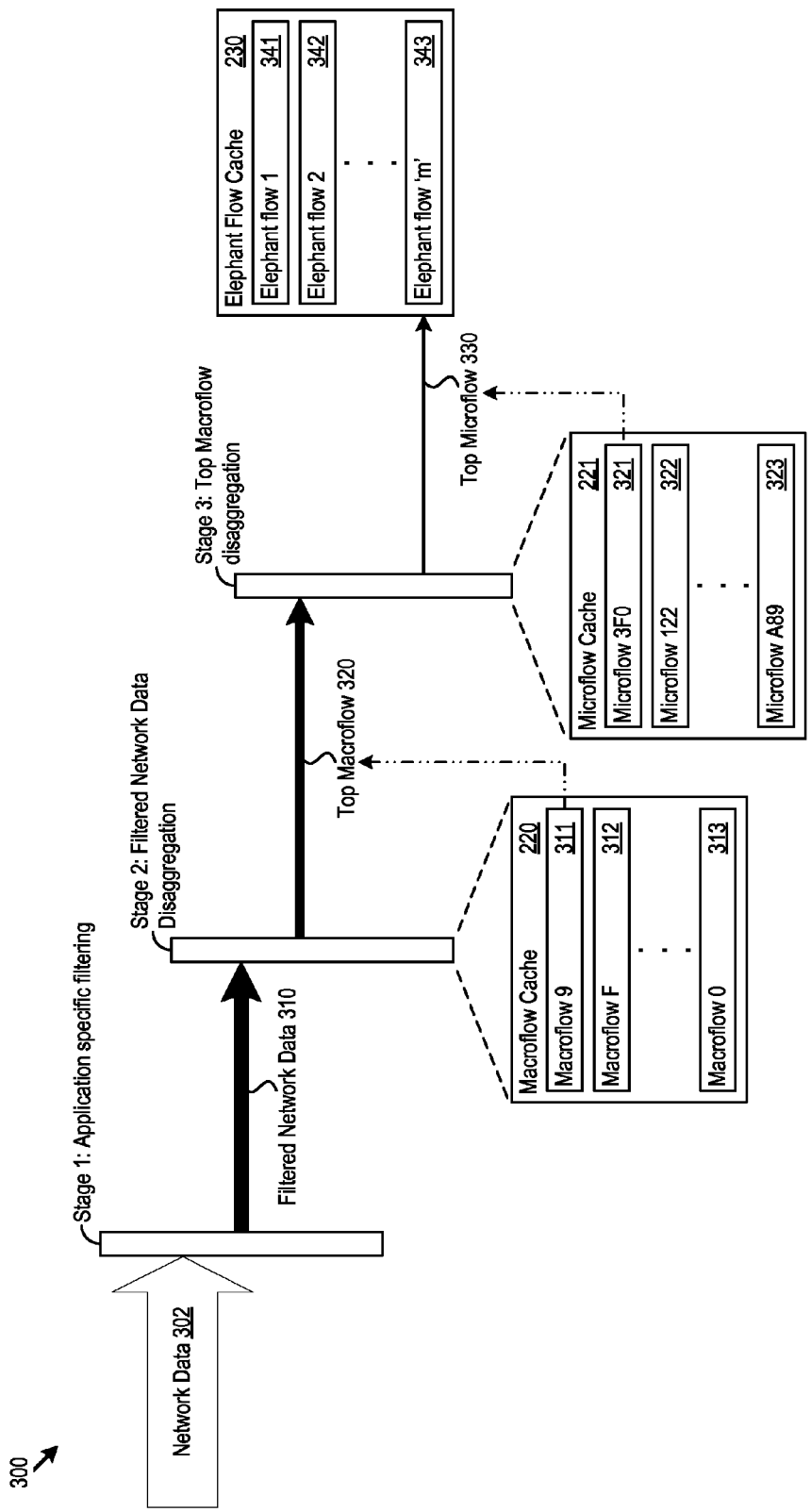
FIG. 3 shows an example of multi-stage elephant flow identification logic that the elephant flow identification logic may perform.

FIG. 3 shows an example of multi-stage elephant flow identification logic 300 that the elephant flow identification logic 202 may perform. The instructions 210 may, for example, implement the identification logic 300. The elephant flow identification logic 300 receives network data 302. The network data may include network traffic received through network interfaces 116 of a network device. In a first stage, the elephant flow identification logic 300 filters the received network data 302 according to the identification parameters 212. The identification parameters 212 may specify any number of filtering criteria, thresholds, and tests, through which the elephant flow identification logic 300 filters the network data 302.

As one particular example, the elephant flow identification logic 300 filters the network data 302 on an application specific basis. As shown in FIG. 3, stage 1 of the multi-stage elephant flow identification process 300 includes application specific filtering of the network data 302. In that regard, the identification parameters 212 may specify one or more packet attributes or other identification parameters associated with a particular application or class of applications through which the elephant flow identification logic 300 filters the network data 302. The identification parameters 212 may specify, as examples, a Virtual Local Area Network ("VLAN") tag, traffic class, MAC address, IP address, data priority, security requirement, latency requirement, or any other packet attribute associated with an application or class of applications. Upon identifying packets matching the application-specific packet attribute(s), the elephant flow identification logic 300 indicates the identified packets are eligible for a subsequent analysis stage. The subsequent analysis stage may lead further towards elephant flow identification, e.g., by separating the identified packets into the filtered network data 310.

In another example application-specific filtering example, a communication network may support application-specific marking in network packets, e.g., through host-based marking by an edge-device and/or marking by a network device on a path between the packet source and its destination. The edge-device or intermediate network device can mark a flow of packets as belonging to a specific application by, as one example, setting predetermined bits in a predetermined field of the packet header. The identification parameters 212 may specify the application identification bits corresponding to a particular application or class of applications as filtering criteria, which the elephant flow identification logic 300 uses as filtering criteria for received network data 302. The elephant flow identification logic 300 may parse packets in the received network data 302 by inspecting the predetermined field of the packet header, and thus identify corresponding application-specific packets and flows eligible for elephant flow identification.

The elephant flow identification logic 300 filters the network data 302 to obtain filtered network data 310. As discussed in greater detail below, the elephant flow identification logic 300 also filters the network data 302 such that one or more previously identified elephant flows are excluded from the filtered network data 310, even if the previously identified elephant flows match the filtering criteria specified by the identification parameters 212. The filtered network data 310 may include additional flows not associated with a particular application or application class, depending on the granularity of the filtering criteria specified by the identification parameters 212. For example, when the identification parameters 212 specify a filtering criteria based on the traffic class tag value of '5', which is the traffic class tag value associated with a particular application, the filtered network data 310 may include flows corresponding to the particular application as well as other flows with a traffic class tag value of '5' that do not correspond to the particular application. As another example, when the identification parameters 212 particularly specify a finer-grained filtering criteria, such as the source IP address and source port associated with the particular application, the filtered network data 310 may exclude all packets in the network flows that do not meet the fine-grained criteria, even if those packets or flows belong to the particular application of interest.

While the discussion above focused on application specific filtering, the identification parameters 212 may specify filters according to any number of criteria. The identification parameters 212 are configurable, and may be predetermined and/or specified by a network operator, e.g., according to a particular application or class of applications known by the network operator to generate elephant flows, such as web-crawling applications or background database update applications. Additional examples of filtering criteria that the identification parameters 212 may be used to filter out network data received by particular network device or portion of the network device, such filtering networked data received by a particular network interface 116 or a particular tile (e.g., tile A 102 or tile D 104). Filtering criteria may be related to a network attribute of one or more attributes, including any Virtual Local Area Network (VLAN) attribute, Equal-cost multi-path (ECMP) attribute or grouping, Link Aggregation (LAG) identification, Trunk identification, etc.

By filtering the network data 302, particularly on an application specific basis, the elephant flow identification logic 300 constrains the flows eligible for elephant flow identification to the filtered network data 310 instead of the entirety of the network data 302 received by a network device. Doing so allows the elephant flow identification logic 300 to increase the speed at which elephant flow(s) are identified by reducing the amount of packets to be further analyzed for elephant flow identification. Application specific filtering of the network data 302 also reduces the number of flows present in the filtered network data 310, reducing the resource requirements to identify elephant flows among the filtered network data 310. Moreover, identifying elephant flows from the application-specific filtered network data 310 can result in fewer false positives because the elephant flow identification logic 300 targets a specific set of flows that, for example, are associated with an application that is known to generate elephant flows. In other implementations, however, the logic 300 may implement other first stage filters. For example, rather than filtering by application, the logic 300 may first filter according to destination IP or Ethernet address, or a range of such addresses.

The elephant flow identification logic 300 may differentiate between different types of elephant flows as well. This differentiation can occur when the identification parameters 212 specify filtering criteria based on a packet attribute that differs between elephant flow types. For example, the elephant flow identification logic 300 may obtain filtered network data 310 that includes flows with a first traffic class value, thereby excluding identification of elephant flows with a second traffic class value. Accordingly, a network device or user (e.g., a network operator) may prioritize or de-prioritize types of elephant flows by specifying a particular identification parameter 212 the elephant flow identification logic 300 uses to filter the network data 302. Put another way, the identification parameters 212 may deliberately specify excluding flows that do not meet the filtering criteria from the filtered network data 310, even when the excluded flows include elephant flows.

Continuing discussion of the multi-stage elephant flow identification process 300, the elephant flow identification logic 302 determines a selected elephant flow from the filtered network data 310. The elephant flow identification logic 300 can disaggregate the filtered network data 310 in multiple steps to determine the selected elephant flow from among the filtered network data 310. In FIG. 3, the elephant flow identification logic 302 employs a two-step determination process, labeled as stage 2 and stage 3 of the exemplary elephant flow identification process 300.

In stage 2, the elephant flow identification logic 300 disaggregates the filtered network data 310 into macroflows, each of which may include multiple flows. In one implementation, the elephant flow identification logic 300 separates packets in the filtered network data 310 to a particular macroflow according to a macroflow criterion, which may be specified in the identification parameters 212. The macroflow criteria may indicate any configuration or parameters used to separate the filtered network data 310 into macroflows, for example through a macroflow hash function. The elephant flow identification logic 300 may apply the macroflow hash function to a predetermined portion of a packet in the filtered network data 310 such that packets in the same flow map to the same hash value. The macroflow hash may output a macroflow hash value for an input value, e.g., mapping a 64 or 128 bit input value into a 16-bit macroflow hash value. Using the outputted hash value, the elephant flow identification logic 300 may determine a macroflow assignment for the packet. As one example, the elephant flow identification logic 300 may apply the macroflow hash function to a five-tuple of the packet that includes, as an example, the following field values of the packet header: source address, destination address, source port, destination port, and protocol number. Alternatively, the elephant flow identification logic 300 may apply the macroflow hash function to a sub portion of the five-tuple value or in combination with other portions of a packet header and/or payload.

Upon applying the macroflow hash function to a packet in the filtered network data 310 (e.g., to a predetermined portion thereof), the elephant flow identification logic 300 assigns the packet to a macroflow corresponding to the resulting hash value and stores the packet in the macroflow cache 220. The elephant flow identification logic 300 also maintains a count value associated with each macroflow assignment, e.g., each macroflow stored in the macroflow cache 220. When a packet is mapped to a particular macroflow, the elephant flow identification logic 300 increments the count associated with the particular macroflow. Accordingly, the elephant flow identification logic 300 tracks high rate macroflows by identifying the respective macroflow(s) with the highest counts. In one variation, the elephant flow identification logic 300 decrements the count of each macroflow, e.g., to age out older macroflows. The logic 300 can decrement counts based on decrement criteria specified in the identification parameters 212, which may specify decrementing the count of one or more macroflow on a periodic basis (including rate, periodicity, etc.), aperiodic basis, in response to any system condition or user request, and more.

The macroflow cache 220 may be implemented as a bubble-up cache. In that regard, the macroflow cache 220 may be implemented such that the macroflows, which can include corresponding packets of the macroflow, are stored in order based on their respective count, data rate, or any other configurable metric. Macroflows with higher or increasing counts propagate up or "bubble up" to the top of the macroflow cache 220. The macroflow cache 220 may be configured to have a limited size, and as a result, lower rate macroflows will be pushed out of the macroflow cache 220 as the elephant flow identification logic 300 disaggregates the filtered network data 310. As examples, the macroflow cache 220 may be implemented as a hash table, a content-addressable memory (CAM), or according to any other memory implementation.

The elephant flow identification logic 300 identifies a top macroflow 320 in the macroflow cache 220. The elephant flow identification logic 202 may identify the top macroflow 320 after a predetermined portion of the filtered network data 310 has been disaggregated, after a predetermined period of time, or according to any other configurable timing criteria that may be specified by the identification parameters 212. In the example shown in FIG. 3, the macroflow cache 220 stores multiple macroflows, including those labeled as macroflow 9 311, macroflow F 312, and macroflow 0 313. Macroflow 9 occupies the highest position in the macroflow cache 220, allowing the elephant flow identification logic 300 to identify macroflow 9 as the top macroflow 320.

In stage 3 of the exemplary multi-stage elephant flow identification process 300, the elephant flow identification logic 300 separates (e.g., disaggregates) the top macroflow 320 into multiple component flows. The elephant flow identification logic 300 may disaggregate the top macroflow 320 into multiple microflows, one of which likely is, or includes, a high rate elephant flow. The elephant flow identification logic 300 may separate the top macroflow 320 according to one or more microflow criterion, such as through a microflow hash function. The elephant flow identification logic 300 may disaggregate the top macroflow 320 such that resulting microflows may include one or more flows, e.g., by applying a microflow hash function that maps packets of different flows into the same microflow. The elephant flow identification logic 300 may apply a microflow hash function to packets in the top macroflow 320 that is orthogonal to the macroflow hash function. Two hash functions may be orthogonal when the hash functions use different parameters in mapping data or when the first and second hash function output different hash values for the same input data.

In disaggregating the filtered network data 310, the top macroflow 320, and/or any other flow, the elephant flow identification logic 300 may disaggregate the flows such that, for a particular packet, a different identifier is determined for each disaggregation process or function. One example is using orthogonal hash functions as described above. However, the elephant flow identification logic 300 may employ any function(s) that produce unique identifiers between a macroflow hash lookup and the microflow hash lookup.

By having applying a microflow hash function that is orthogonal to the macroflow hash function, the elephant flow identification logic 300 may implement a greater degree of disaggregation of the top macroflow 320. In one implementation, the elephant logic 202 may completely disaggregate the top macroflow 320 such that each resulting microflow is a separate flow, in the sense that each separate flow includes packets from the top macroflow 320 that share a common set of flow specific attributes, e.g., according to the five-tuple of each packet or a predetermined portion thereof.

To disaggregate the top macroflow 320 into multiple microflows, the elephant flow identification logic 300 can separate packets in the top macroflow 320 to a corresponding microflow. In separating the packets, the elephant flow identification logic 300 increments a count for the corresponding microflow, allowing the elephant flow identification logic 300 to track high rate microflows. The microflows, which can include the respective packets associated with the microflows, are stored in the microflow cache 221. The microflow cache 221 may be implemented as a bubble-up cache in a similar manner as described above with respect to the macroflow cache 220. By disaggregating the top macroflow 320 into microflows, the elephant flow data is identified at a finer granularity, allowing more precise management and processing of an identified elephant flow.

The elephant flow identification logic 300 identifies a top microflow 330 from the microflow cache 221. The elephant flow identification logic 202 may identify the top microflow 330 after a predetermined portion of the top macroflow 320 has been disaggregated, after a predetermined period of time (e.g., as measured after receiving obtaining the top macroflow 320), or according to any other configurable timing criteria that may be specified by the identification parameters 212. In the example shown in FIG. 3, the elephant flow identification logic 202 disaggregates top macroflow 320 among 4,096 microflows (identified through 48 bit identifiers) and the microflow cache 221 stores multiple microflows, including those labeled as microflow 3F0 321, microflow 122 322, and microflow A89 323. Microflow 3F0 occupies the highest position in the microflow cache 221, allowing the elephant flow identification logic 300 to identify microflow 3F0 as the top microflow 330. beled as stage 2 and stage 3 of the exemplary elephant flow identification process 300.

In one implementation, the elephant flow identification logic 300 identifies the top microflow 330 as the selected elephant flow from the network data 302. The elephant flow identification logic 300 inserts the selected elephant flow (e.g., microflow 3F0 in the example shown in FIG. 3) into the elephant flow cache 230. The elephant flow cache stores elephant flows identified by the elephant flow identification logic 300, including the elephant flows labeled as elephant flow 1 341, elephant flow 2 342, and elephant flow 'm' 343.

The elephant flow identification logic 300 maintains the elephant flow cache 230 by monitoring the stored elephant flows according to monitoring criteria specified in the identification parameters 212. For example, the elephant flow identification logic 300 may monitor the data rate, count, throughput, or any other characteristic of the elephant flows stored in the elephant cache 231. The elephant flow identification logic 300 may eject a particular elephant flow when the particular elephant flow fails to satisfy the monitoring criteria. In one implementation, the elephant flow identification logic 300 tracks a count associated with each stored elephant flow and decrements the count of the stored elephant flows at a predetermined rate specified by the identification parameters 212. In this way, the elephant flow identification logic 300 can age-out (e.g., eject) previously identified elephant flows whose throughput or data rate have decreased.

The elephant flow cache 230 may be implemented with a finite depth. As such, the elephant flow identification logic 300 may perform an elephant flow identification process, e.g., the exemplary process 300, as requested by a user or in response to an identification triggering event. A triggering event occurs when a position in the elephant flow cache 230 becomes available, such as when an elephant flow is ejected by the elephant flow identification logic 300. In response to occurrence of the identification triggering event, the elephant flow identification logic 300 determines a selected elephant flow from received network data 302 for insertion into the elephant flow cache 230. Additional triggering events can occur in any number of configurable events, and for example specified in the identification parameters 212. Triggering events may be configured on a per-link, per-tile, per-device basis, or per-network basis, and may include when a buffer exceeds a predetermined buffer threshold, when link capacity or utilization exceeds a predetermined rate, when a number of dropped packets exceeds a drop threshold, for example Any number of stages may be added or removed from the exemplary multi-stage elephant flow identification process 300 shown in FIG. 3. In one variation, the elephant flow identification logic 300 may forego filtering the network data 302 and disaggregate the network data 302 into multiple macroflows instead of disaggregating the filtered network data 310. As another variation, the elephant flow identification logic 300 may employ additional steps to disaggregate the top microflow 330 when the microflow contains multiple flows, e.g., when the elephant flow identification logic 300 disaggregates the top macroflow 320 using microflow hash function. The elephant flow identification logic 300 may likewise apply hash functions that vary in granularity, e.g., as differentiated by the number of disaggregated subflows (e.g., macroflows and microflows) that result from the applying the hash function to an inputted stream of packets (e.g., network data 302, filtered network data 310, top macroflow 320, etc.)

The elephant flow identification logic 300 may also determine whether an elephant flow is present within the filtered network data 302, top macroflow 320, top microflow 330, or any other data. For example, the identification parameters 212 may indicate elephant flow criteria, such as a bandwidth, volume, or duration threshold (and more) to determine whether an identified macroflow, microflow, flow, or other data from elephant flow identification processing includes an elephant flow according to the specified criteria. The logic 300 may include an elephant flow verification stage to determine whether the identified top microflow 330 meets the elephant flow criteria, and forego inserting the top microflow 330 into the elephant flow cache 230 when the top microflow 330 (or any other identified flow) fails to meet the elephant flow criteria. As another example, the logic 300 may include disaggregation functions that also verify disaggregated data meets one or more of the elephant flow criteria, such as a modified microflow or macroflow hash function that verifies that disaggregated data meets the elephant flow criteria before storing the data into the macroflow cache 220 or microflow cache 221.

Figure 4:
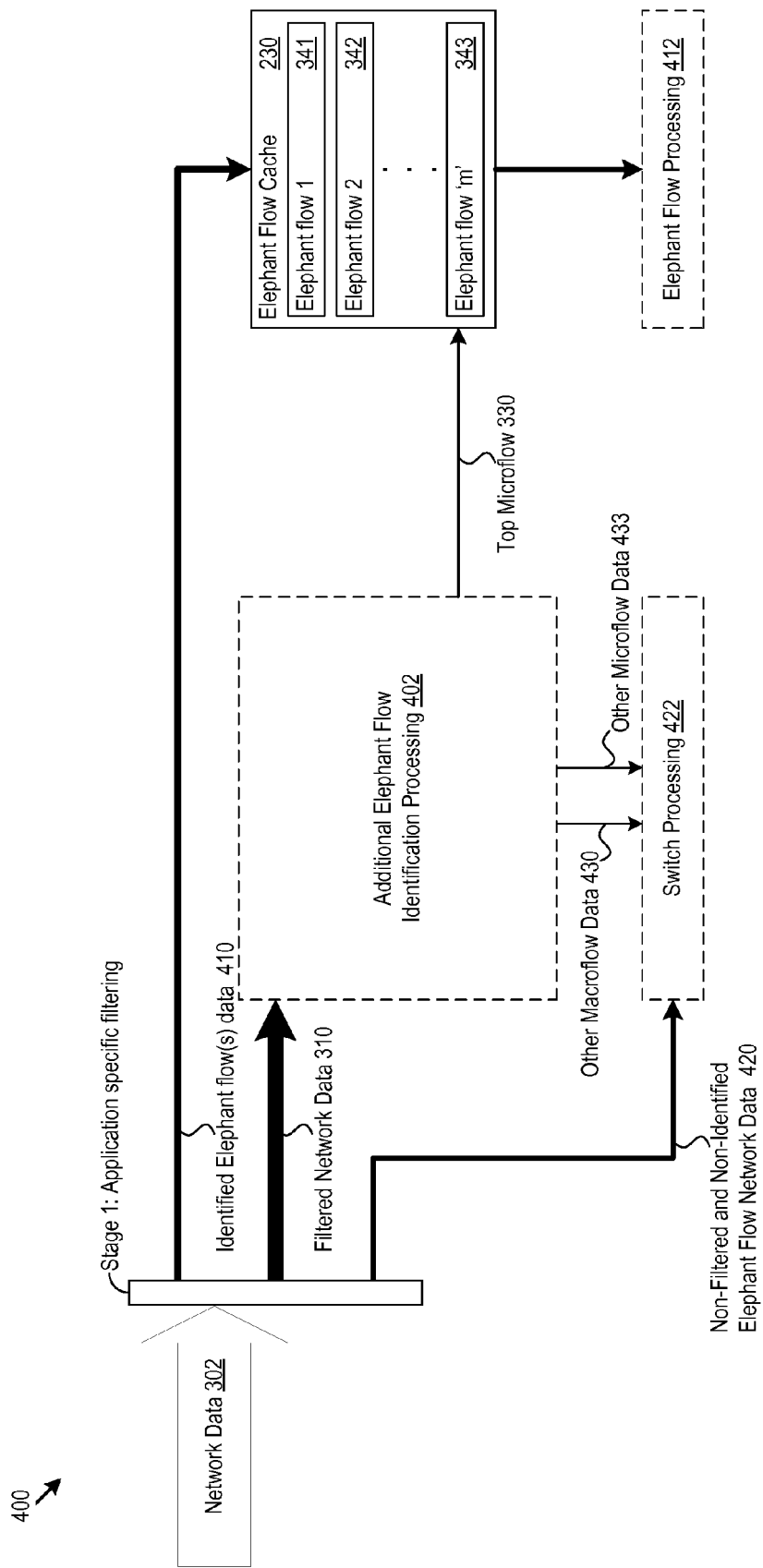
FIG. 4 shows an example of a data routing that elephant flow identification logic may perform.

FIG. 4 shows an example of a data routing 400 that may be performed by the elephant flow identification logic 220. As discussed above, the elephant flow identification logic 202 receives network data 302, and filters the network data 302 to obtain filtered network data 310. The elephant flow identification logic 202 forwards the filtered network data 310 for additional elephant flow identification processing 402 (e.g., stage 2 and stage 3 as shown in FIG. 3). The additional elephant flow identification processing 402 may yield a top microflow 330, which the elephant flow identification logic 202 determines as a selected elephant flow for insertion into the elephant flow cache 230. During the elephant flow identification process, the elephant flow identification logic 202 also routes data other than the determined top microflow 330 for subsequent processing, including the macroflow data other than the top macroflow 320 and microflow data other than the top microflow 330. Subsequent processing may include packet routing by switching logic in the switch architecture 100, such as the ingress logic 108.

In the example shown in FIG. 4, the elephant flow identification logic 202 may first extract identified elephant flow data 410 from the network data 302 before filtering the network data 302. The elephant flow data 410 includes packets from elephant flows already identified in the elephant flow cache 230. In one implementation, the elephant flow identification logic 202 may send the extracted elephant flow data 410 for storing in the elephant flow cache 230 and for further subsequent elephant flow processing 412. To extract the identified elephant flow data 410, e.g., packets belonging to an identified elephant flow, the elephant flow identification logic 202 may apply the corresponding disaggregation processing that the elephant flow identification logic 202 uses to identify a microflow as a selected elephant flow, e.g., a microflow hash function applied in stage 3 of FIG. 3 above. For example, the elephant flow identification logic 202 may extract, as part of the elephant flow data 410, a packet from the network data 320 with a microflow hash function value or five-tuple that corresponds to an identified elephant flow currently stored in the elephant flow cache 230. In this regard, the elephant flow identification logic 202 may ensure the filtered network data 310 does not include data belonging to already identified elephant flows, whose data is stored in the elephant flow cache 320. A network device may perform elephant flow processing 412 on the elephant flow packets stored in the elephant flow cache 230, as discussed in greater detail below in connection with elephant flow management.

The elephant flow identification logic 202 obtains filtered network data 310 that is sent for additional elephant flow identification processing 402 to identify the top microflow 330. As for the remaining non-filtered and non-identified elephant flow network data 420 that is not eligible for elephant flow identification according to the identification parameters 212, the elephant flow identification logic 202 may send this remaining data 420 for switch processing 422, e.g., for routing by switching logic of the switch architecture 100.

The elephant flow identification logic 202 also routes portions of the filtered network data 310 and/or the top macroflow 320 that are not part of the top microflow 330. In the example where the additional elephant flow identification processing 402 includes stages 2 and 3 from FIG. 3 above, the other macroflow data 430 includes packet data from each of the macroflows other than the top macroflow 320. The other microflow data 433 includes packet data from each of the microflows other than the top microflow 330. Put another way, the other macroflow data 430 and other microflow data 433 include the packets from the filtered network data 310 that are not part of selected elephant flow, e.g., the top microflow 330. The elephant flow identification logic 202 routes the other macroflow data 430 for switch processing 422, e.g., contemporaneously or after determining the top macroflow 320. In a similar fashion, the elephant flow identification logic 202 may route the other microflow data 433 for subsequent switch processing 422 upon identifying the top microflow 330.

Figure 5:
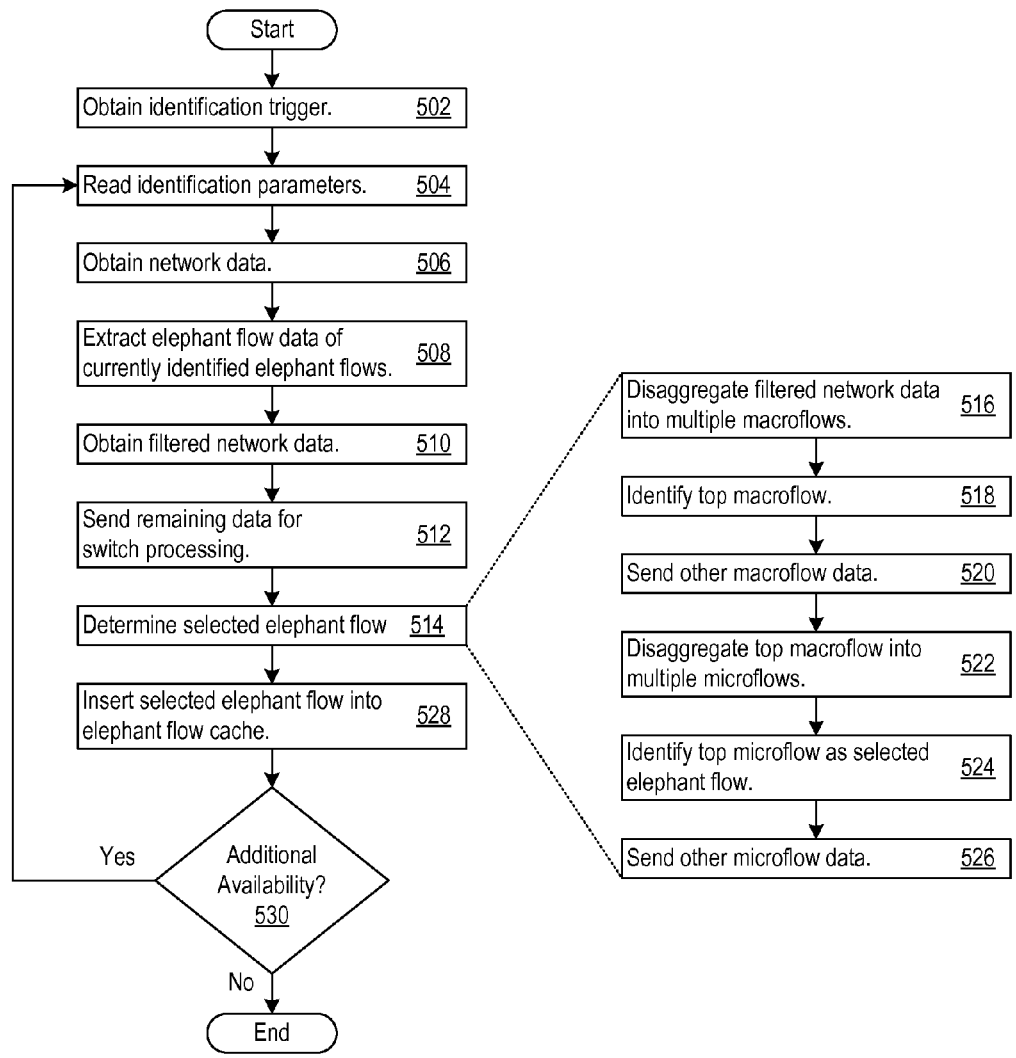
FIG. 5 shows an example of logic for elephant flow identification.

FIG. 5 shows an example of logic 500 that the elephant flow identification logic 202 may implement for elephant flow identification. The elephant flow identification logic 202 may implement the logic 500 as hardware, firmware, or software. The elephant flow identification logic 202 obtains an identification trigger (502), due to an availability (e.g., open entry) in the elephant flow cache 230 or any other configurable system condition or event. The elephant flow identification logic 202 may alternatively or additionally obtain an identification trigger as a result of from a user request, according to a periodic schedule, or in response to changes in utilization or resource usage in the network device, e.g., when a link exceeds a particular capacity, when latency through the network device exceeds a latency threshold, when a queue level exceeds a predetermined threshold, when power consumption exceeds a trigger threshold, and more. The identification trigger may include user specified filtering criteria, such as application specific packet attribute, network specific attribute, class of service attribute, priority attribute, VLAN attribute, packet grouping attribute, etc. used to filter received network 302 and identify an elephant flow from.

In response to obtaining the identification trigger, the elephant flow identification logic 202 determines a selected elephant flow. In doing so, the elephant flow identification logic 202 reads identification parameters 212 (504) and obtains network data 320 (506). The elephant flow identification logic 202 extracts, from the received network data 302, elephant flow data 410 of already identified elephant flows, e.g., previously identified by the elephant flow identification logic 202. The elephant flow identification logic 202 sends the extracted elephant flow data 410 for storage in the elephant flow cache 230 (508). The elephant flow identification logic 202 may extract packets as elephant flow data 410 based on, for example, microflow hash function values and/or five-tuple values corresponding to identified elephant flows currently stored in the elephant flow cache 230. The elephant flow identification logic 202 also updates a respective count for each packet extracted from the network data 302 as elephant flow data 410.

When specified by the identification parameters 212, the elephant flow identification logic 202 applies filtering criteria and obtains filtered network data 310 (510). The elephant flow identification logic 202 sends the remaining non-filtered and non-elephant flow network data 420 for processing by, for instance, switching logic on a network device (512).

The elephant flow identification logic 202 also determines a selected elephant flow from the filtered network data 310 (514). In one implementation, the elephant flow identification logic 202 executes a multi-step identification process, including separating the filtered network data 310 into multiple macroflows (516), identifying a high rate macroflow as a top macroflow 320 (518), and send other macroflow data 430 for processing by other switching logic (520). The elephant flow identification logic 202 may then separate the top macroflow 320 into multiple microflows (522), identify the microflow with the highest data rate as the top microflow 330 and selected elephant flow (524), send the other microflow data 433 for processing by switch logic (526). Upon identifying the selected elephant flow, the elephant flow identification logic 202 inserts the selected elephant flow into the elephant flow cache 230 (528). When the elephant flow cache 230 has additional availability (530), the elephant flow identification logic 202 may repeat the identification process to determine another selected elephant flow (504-528).

Figure 6:
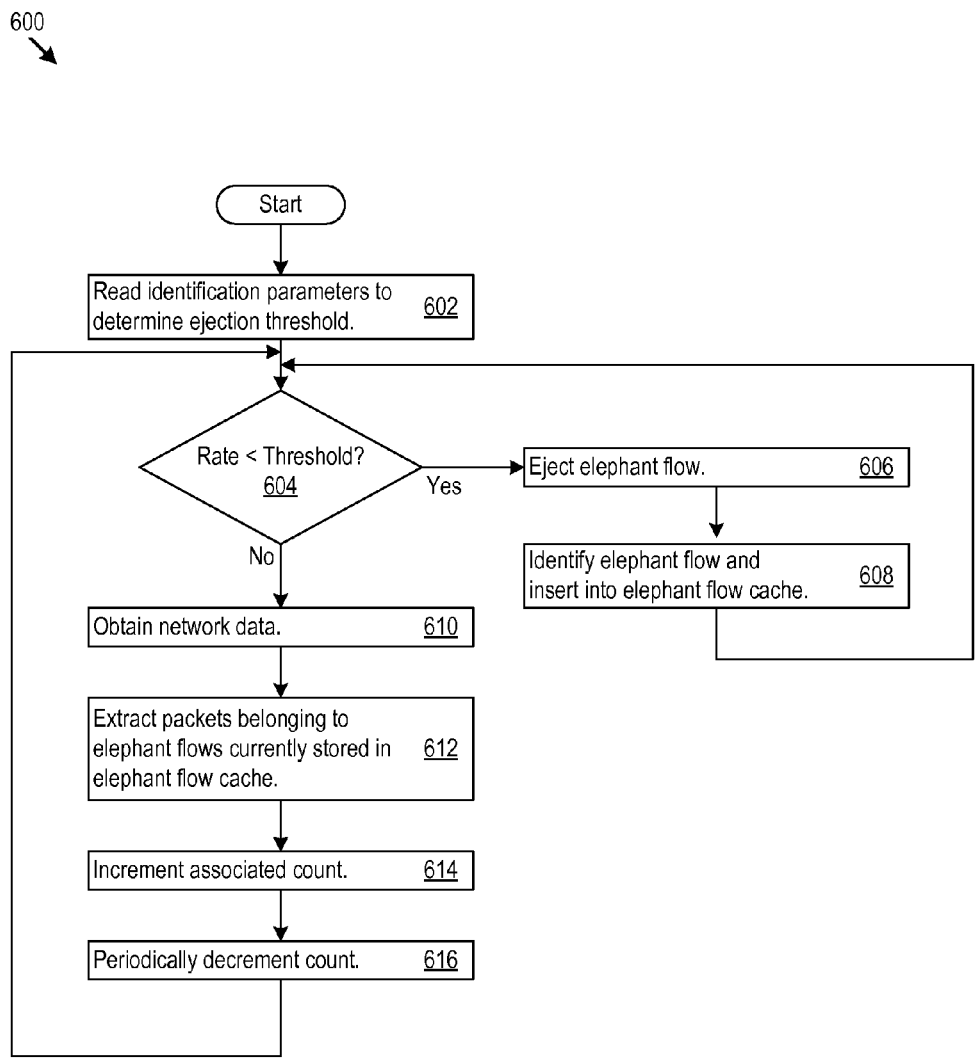
FIG. 6 shows an example of logic for monitoring an elephant flow cache.

FIG. 6 shows an example of logic 600 that the elephant flow identification logic 202 may implement to monitor the elephant flow cache 230. The elephant flow identification logic 202 may implement the logic 600 as hardware, firmware, or software. The elephant flow identification logic 202 reads the identification parameters 212 to determine an ejection threshold (602) for elephant flows stored in the elephant flow cache 230. The ejection threshold may, for example, specify a minimum criterion that an elephant flow currently stored in the elephant flow cache 230 must maintain, e.g., a minimum count, minimum data rate, etc.

The elephant flow identification logic 202 monitors the elephant flow cache 230 and determines whether any of the stored elephant flow's data rate (or count) falls below the ejection threshold (604). If so, the elephant flow identification logic 202 may eject the particular elephant flow that fails to meet the ejection threshold (606). Ejection may occur by removing the ejected flow packets from memory, by marking their memory space as available for new data to be stored there, by overwriting the data with a particular clearing pattern, or in other ways. The elephant flow identification logic 202 may then identify a new elephant flow to replace the ejected elephant flow, e.g., in any of the ways described in accordance with FIGS. 2-5 above. The elephant flow identification logic 202 inserts the new elephant flow into the elephant flow cache 230.

In maintaining the elephant flow cache 230, the elephant flow identification logic 202 obtains network data 302 (610). The elephant flow identification logic 202 may obtain network data 302 independent of whether the elephant flow identification logic 202 is in the process of identifying a new elephant flow for insertion into the elephant flow cache 230 (such as the processing shown in FIG. 5). In one implementation, the elephant flow identification logic 202 stores packets associated with each identified elephant flow in the elephant flow cache 230. Accordingly, the elephant flow identification logic 202 may inspect the network data 302 and extract packets belonging to any of the elephant flows currently stored in the elephant flow cache 230 (612). For example, the elephant flow identification logic 202 may extract a packet with a microflow hash function value or five-tuple corresponding to an elephant flow stored in the elephant flow cache 230. For each elephant flow packet extracted from the network data 302, the elephant flow identification logic 202 increments a count associated the respective elephant flow (614). As such, the elephant flow identification logic 202 may monitor the data rate and count of elephant flows stored in the elephant cache 230.

The elephant flow identification logic 202 can decrement the count of elephant flows stored in the elephant cache 230 (616), such as on a periodic or aperiodic basis, or as further specified by the identification parameters 212. The elephant flow identification logic 202 may continue to monitor whether the data rate of stored elephant flows falls below the ejection threshold (604), e.g., as result of a periodic or aperiodic count decrement.

In one implementation, the elephant flow cache 230 is configured to store entries for each currently identified elephant flow. An entry in the elephant flow cache 230 may store, for example, a current count, matching microflow hash function value, associated five-tuple, or other identifying/characteristic information of a currently identified elephant flow. Entries in the elephant flow cache 230 may not include packet data of identified elephant flows. Instead of storing extracted packet data in the elephant flow cache 230, the elephant flow identification logic 202 may send the extracted elephant flow packets for elephant flow processing 412, which may include any of the elephant flow management processing described below in FIGS. 7-10.

Elephant Flow Management

Upon identifying an elephant flow, a network device may take management actions on the elephant flow. The management actions may, as one example, try to mitigate any impacts the high rate, high volume, and/or high duration elephant flow may have on other network data handled by the network device. In that regard, the network device may employ any of the elephant flow management processes described below.

Figure 7:
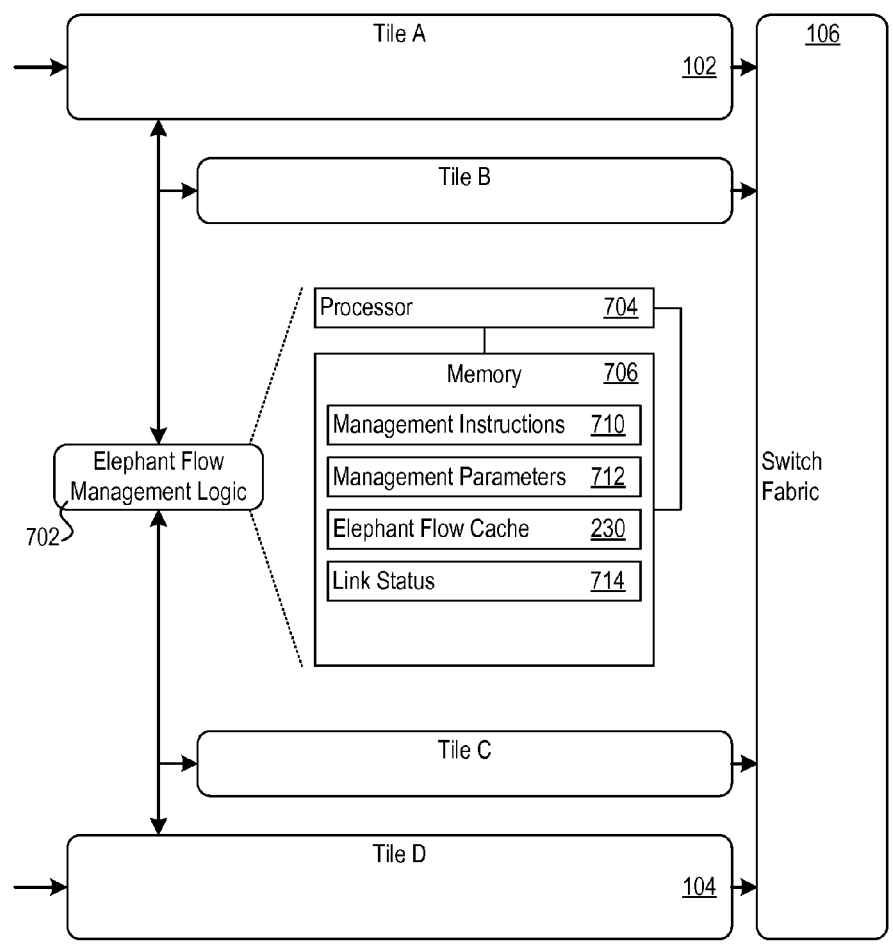
FIG. 7 is an example of switch architecture extended to include elephant flow management logic.

FIG. 7 is an example of switch architecture 700 extended to include elephant flow management logic 702. The elephant flow identification logic 202 may be implemented in any combination of hardware, firmware, or software. The elephant flow management logic 702 may be implemented at any one or more points in the architecture 100, or in other architectures of any network device. As examples, the elephant flow management logic 702 may be a separate controller or processor/memory subsystem. The elephant flow management logic 702 may be incorporated into, and share the processing resources of the ingress logic 108, egress logic 110, fabric interfaces 120, network interfaces 116, or switch fabric 106. The elephant flow management logic 702 may overlap or share any number of common elements or logic with the elephant flow identification logic 202 discussed above.

In the example of FIG. 7, the elephant flow management logic 702 includes a processor 704 and a memory 706. In some implementations, the memory 706 stores management instructions 710, management parameters 712, an elephant flow cache 230, and link status information 714. The processor 704 executes the identification instructions 710 to manage one or more elephant flows processed by the switch architecture 700. As described in greater detail below, the elephant flow management logic 702 can control flow characteristics of the elephant flow, such as by limiting the data rate of the elephant flow by adapting a network resource in the network device implementing the switch architecture 700. The elephant flow management logic 702 may additionally or alternatively manage the path the elephant flow is communicated across, for example by determining a selected network link to communicate the elephant flow through, out of the network device, and on to the next hop toward the ultimate destination for the flow.

Upon identifying an elephant flow, e.g., as in any of the ways described above, the elephant flow management logic 702 may specifically handle or process the elephant flow to minimize the elephant flow's impact on other network traffic handled by a network device or communicated across a network. One way to minimize the impact of an elephant flow is to control one or more flow characteristics of the elephant flow. Examples of how the elephant flow management logic 702 can control flow characteristics of an elephant flow are presented next.

Figure 8:
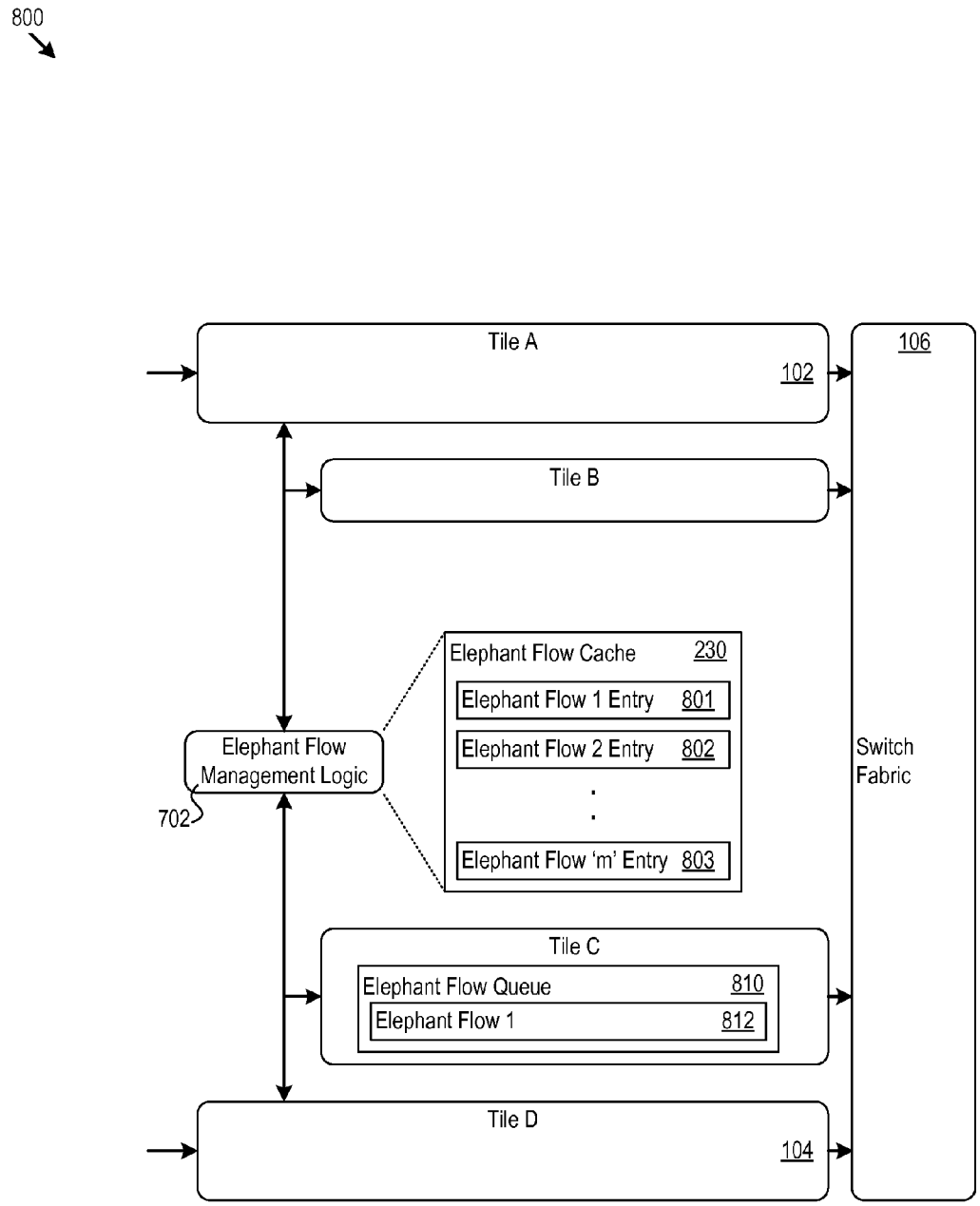
FIG. 8 shows an example of switch architecture that includes an adapted network resource for handling an elephant flow.

As a first example, the elephant flow management logic 702 may adapt a network resource in the network device to handle packet data associated with the elephant flow. FIG. 8 shows an example of switch architecture 800 with an adapted network resource for handling an elephant flow. In particular, FIG. 8 shows an elephant flow queue 810 dedicated to servicing data associated with the elephant flow labeled as elephant flow 1 812.

The elephant flow management logic 702 obtains packet data for storing in the elephant flow queue 810 by accessing the elephant flow cache 230. In doing so, the logic 702 identifies an elephant flow or obtains packet data associated with the elephant flow from received network data. In the example shown in FIG. 8, the elephant flow management logic 702 maintains an elephant flow cache 230 that includes entries for each currently identified elephant flow. As shown, the elephant flow cache 320 includes multiple entries, including the entries labeled as the elephant flow 1 entry 801, elephant flow 2 entry 802, and elephant flow 'm' entry 803. An entry in the elephant flow cache 230 may store, for example, packet data belonging to a particular elephant flow, a count value, or identifying information corresponding to the particular elephant flow. The identifying information may include a microflow hash value associated with the particular elephant flow, one or more identifiers (e.g., a five-tuple of predetermined packet header fields) identifying the particular elephant flow, or any other information that identifies or characterizes the particular elephant flow. Accordingly, in one implementation, the elephant flow management logic 702 retrieves the packet data of elephant flow 1 812 buffered in the elephant flow cache 230, e.g., as stored there by the elephant flow identification logic 202. In another implementation, the elephant flow management logic 702 obtains identifying information of elephant flow 1 812 from the elephant flow entry 801 and extracts the packet data of elephant flow 1 812 from received network data (which may be stored elsewhere). The logic 702 then stores the obtained packet data of elephant flow 1 812 into the elephant flow queue 810.

The elephant flow queue 810 may be a special-purpose queue specifically dedicated for handling elephant flow data. In that regard, the elephant flow queue 810 may be unused by the switch architecture 800 or network device until identification of elephant flow and allocating of the elephant flow queue 810 for handling associated data of the identified elephant flow. The elephant flow queue 810 may, for example, be implemented as a high priority diffsery queue, where certain classes of service levels are reserved for elephant traffic. The elephant flow queue 810 may an additional queue in a network device (e.g., over and above standard diffsery queues) and configured for solely handling elephant flow traffic.

In a variation, the elephant flow management logic 702 may repurpose a selected queue in the network device previously used for handling non-elephant flow data. In this case, the elephant flow logic 702 may empty the selected queue, e.g., by restricting additional non-elephant flow data from being stored into the selected queue and completing processing of any remaining non-elephant flow data stored in the queue. Then, the elephant flow management logic 702 may store received elephant flow data into the selected queue, thus repurposing the selected queue into the elephant flow queue 810.

The elephant flow queue 810 may be dedicated for handling only elephant flow data. The elephant flow management logic 702 may assign one particular elephant flow to the elephant flow queue 810, e.g., elephant flow 1 812 in FIG. 8. Alternatively, the elephant flow management logic 702 may assign multiple elephant flows to the elephant flow queue 810. By configuring one or more dedicated elephant flow queues such as elephant flow queue 810, the elephant flow management logic 702 can control flow characteristics of an elephant flow by controlling queue characteristics of the dedicated elephant flow queues. Thus, the elephant flow management logic 702 supports fine-grained control over an elephant flow, allowing a user (e.g., network operator) greater control over elephant flows communicated across a network.

The elephant flow management logic 702 can configure the elephant flow queue 810 according to management parameters 712. The management parameters 712 may specify various configuration options. For example, the elephant flow management logic 702 may configure the elephant flow queue 810 according to a desired bandwidth, e.g., through min-max shaping, by specifying a dequeue rate for the elephant flow queue 810, or according to other bandwidth control techniques. The management parameters 712 may specify a particular bandwidth to allocate to an elephant flow, or a bandwidth percentage relative to the total bandwidth capability of a link, a network device, or other resource capability in the network device.

The elephant flow management logic 702 can additionally or alternatively configure a drop rate of the elephant flow queue 810, including through a queue threshold. As such, when the amount of elephant flow data stored in elephant flow queue 810 reaches the configured queue threshold, the network device drops subsequent packets in the elephant flow, which may trigger a response in a source device sending the elephant flow. For example, a source device sending the elephant flow may slow the rate of the elephant flow in accordance with a TCP response to the dropped packets of the elephant flow. Phrased in a different way, the elephant flow management logic 702 can customize the drop behavior of the elephant flow queue 810 to control one or more flow characteristics of an elephant flow.

As another example, the elephant flow management logic 702 may configure marking of one or more packets stored in the elephant flow queue 810 according to any flow control making scheme, including through explicit congestion notification (ECN) markings used to slow the rate the elephant flow is transmitted from a source. The elephant flow logic 702 may use any congestion notification marking scheme to mark one or more of packets stored in the elephant flow queue 810, such as Quantized Congestion Notification (QCN) markings, Forward Explicit Congestion Notification (FECN) markings, and more. Additionally or alternatively, the elephant flow management logic 702 may apply traffic shaping to the elephant flow queue 810. The elephant flow management logic 702 may apply static traffic shaping and/or dynamic traffic shaping, e.g., based on utilization of port bandwidth for one or more ports.

In addition to or as an alternative to controlling one or more flow characteristics of an elephant flow, the elephant flow management logic 702 may take path management actions on an elephant flow. As elephant flows are typically characterized by a high rate and long duration, operation of a network device may be impacted when multiple elephant flows assigned to a single network link. A network link may refer to a link passing through a common network device or any portion thereof, e.g., a common network interface or set of network interfaces, such as logical or physical outgoing network ports. As another example, assigning a network link may include identifying a next device to send the elephant flow through, e.g., a next-hop device between the source and destination. Multiple elephant flows assigned to a single network link (e.g., the same next device) will likely result in backlog, congestion, or other disruptive impact, for example as caused by exceeding a line rate of a network port of the switch device assigned to the network link. As one of way of addressing this issue, the elephant flow management logic 702 may determine a selected network link to assign an elephant flow to, based on link status of available network links.

Figure 9:
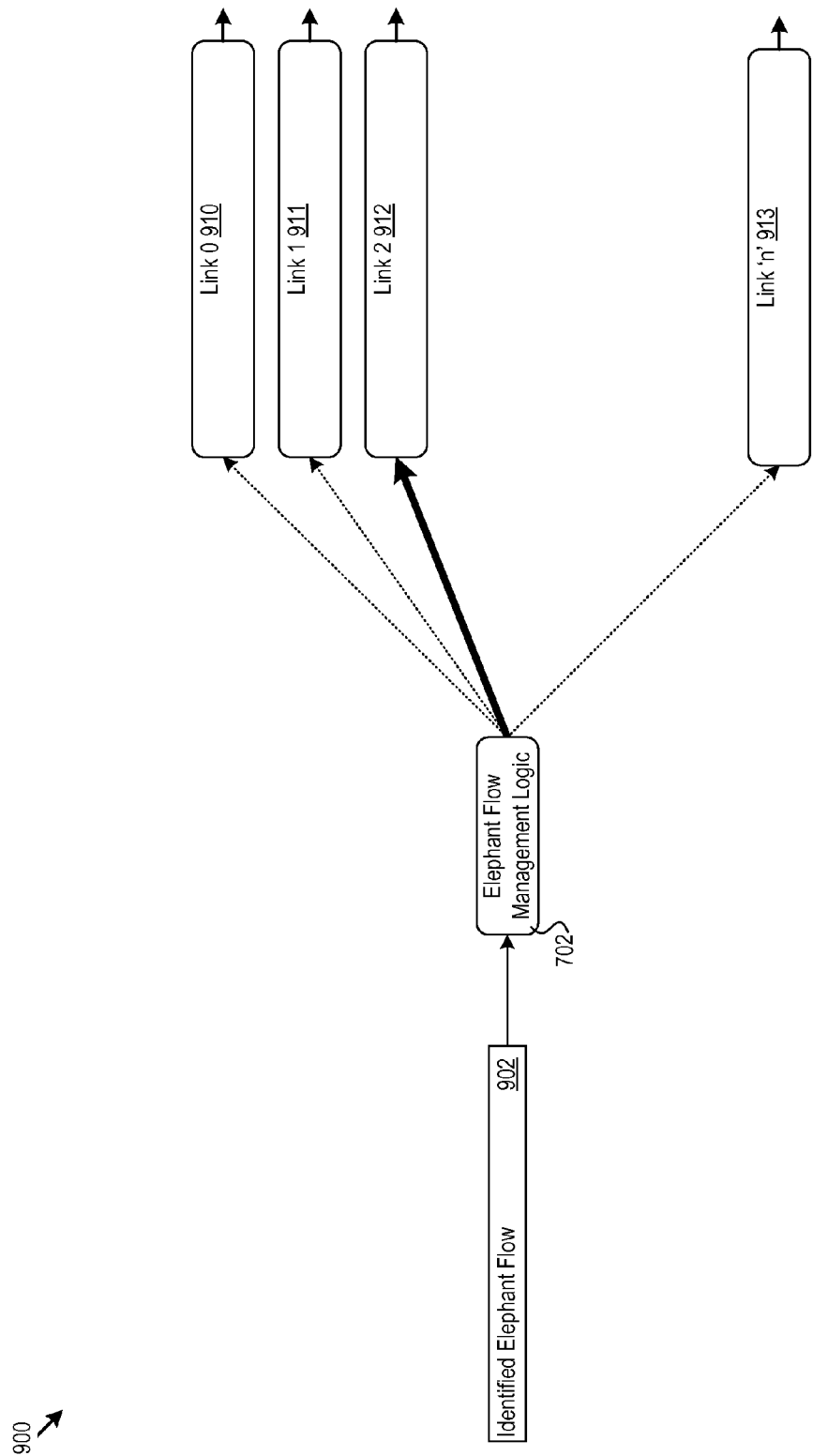
FIG. 9 shows an example of elephant flow path management process that the elephant flow management logic may perform.

FIG. 9 shows an example of elephant flow path management process 900 that the elephant flow management logic 702 may perform. The elephant flow management logic 702 obtains an indication of an identified elephant flow 902, such as an indication from the elephant flow identification logic 202 that a new elephant flow has been identified. In response, the elephant flow management logic 702 may determine a selected network link to assign the identified elephant flow 902 to. The elephant flow management logic 702 determines the selected link from among available links in the network device for sending the identified elephant flow 902 to its destination. Multiple available links are depicted in FIG. 9, including the links labeled as link 0 910, link 1 911, link 2 912, and link 'n' 913. The elephant flow management logic 702 may assign the identified elephant flow 902 to the selected link by routing packet data of the identified elephant flow 902 to the associated egress logic 114 of a network port assigned to the selected network link.

The elephant flow management logic 702 determines a selected link to assign the identified elephant flow 902 according to one or more link selection criteria, which may be specified in the management parameters 712. In order to apply the link selection criteria, the elephant flow management logic 702 obtains link status information 714 for the available links. The link selection criteria may be specified according to any characteristic or status of the available links, network resources associated with the available link, historical trends of the available links, and more. In one example, the link selection criteria may be based on the utilization of egress logic 114 allocated to the link, and the elephant flow management logic 702 may select the network link with the lowest current utilization, as determined from the link status information 714. As another example, the link selection criteria may specify selecting any network link with a utilization less than a predetermined utilization threshold. Any criteria based on link utilization are contemplated. The elephant flow management logic 702 may determine a selected link based on the other link considerations as well, including number of packets in a buffer associated with the link, historical trends of the link, maximum line rate of a network port associated with a link, utilized line rate, port queue size(s), port queue fill rate, and more.

The elephant flow management logic 702 may determine a selected link to assign a newly identified elephant flow based on how other previously identified elephant flows are assigned. In one implementation, the elephant flow management logic 702 avoids assigning the elephant flow to any network link that has already been assigned another elephant flow. The elephant flow management logic 702 can also determine a selected link based on one or more characteristics of already assigned elephant flows, including number of elephant flows assigned to available links in the network device, consumed bandwidth or data rate of assigned elephant flows, assigned elephant flow duration, and more. As one example, when the elephant flow management logic 702 determines that each of the available network links has been previously assigned an elephant flow, the elephant flow management logic 702 may assign a newly identified elephant flow to the available network link whose previously assigned elephant flow consumes the least bandwidth of the available network link or in combination with other link criteria discussed above, e.g., based on total bandwidth amount, percentage of line rate occupied by already assigned elephant flow(s), utilization, remaining available bandwidth, etc.

The management parameters 712 and/or entries of the elephant flow cache 230 may specify characteristics of one or more managed elephant flows. One such characteristic is a flow pattern for the elephant flow, e.g., a flow rate, flow behavior such as whether the data rate of the elephant flow is steady, occurs in bursts, timing between data flow bursts, length of data flow bursts, etc. For bursty elephant flows, the elephant flow management logic 702 may identify a burst period, e.g., by monitoring one or more elephant flow queues 810 assigned to handle elephant flow data. During the identified burst period of an elephant flow, the elephant flow management logic 702 may reallocate an elephant flow, e.g., to a selected network link determined according to link selection criteria as discussed above.

In one scenario, the elephant flow management logic 702 may obtain an indication of a newly identified elephant flow that was identified mid-flow. The newly identified elephant flow may have been discovered after a first portion of the identified elephant flow was already assigned to a current network link which does not meet the management parameters 712, e.g., a link already handling at least one other elephant flow. In this case, the elephant flow management logic 702 may determine a different network link to assign the newly identified elephant flow, so as to avoid overloading the current network link already handling other elephant flows.

In reassigning the identified mid-flow elephant flow to a different network link, the elephant flow management logic 702 may flow control the identified mid-flow elephant flow to prevent out-of-order communication of packets in the elephant flow. In that regard, the elephant flow management logic 702 may inject delay into processing of subsequent packets of the identified mid-flow elephant flow, e.g., by stopping processing of a second portion of the elephant flow being reassigned to a different network link. The elephant flow management logic 702 may configure a delay for a determined period of time that exceeds the skew between the current network link previously assigned to communicate the first portion of the newly identified elephant flow and the different network link selected to communicate the second portion of the elephant flow. In this way, the elephant flow logic 702 may ensure the first portion of the elephant flow is received by a destination device prior to the second portion of the elephant flow, thus maintaining the communication order of the elephant flow. The elephant flow management logic 702 may perform the flow control and insert the delay through ingress logic of the switch architecture 900, for example.

Using any combination of the above-described link determination processes and criteria, the elephant flow management logic 702 can control the path an identified elephant flow is communicated through. In doing so, the elephant flow management logic 702 can limit the disruptive impact of the elephant flow on, for example, high priority and/or low latency non-elephant flow traffic. The elephant flow management logic 702 can efficiently and more optimally balance the load of elephant flow traffic by specifically managing identified elephant flows, resulting in better traffic distribution that reduces delay for some or all network traffic handled by a network device.

Figure 10:
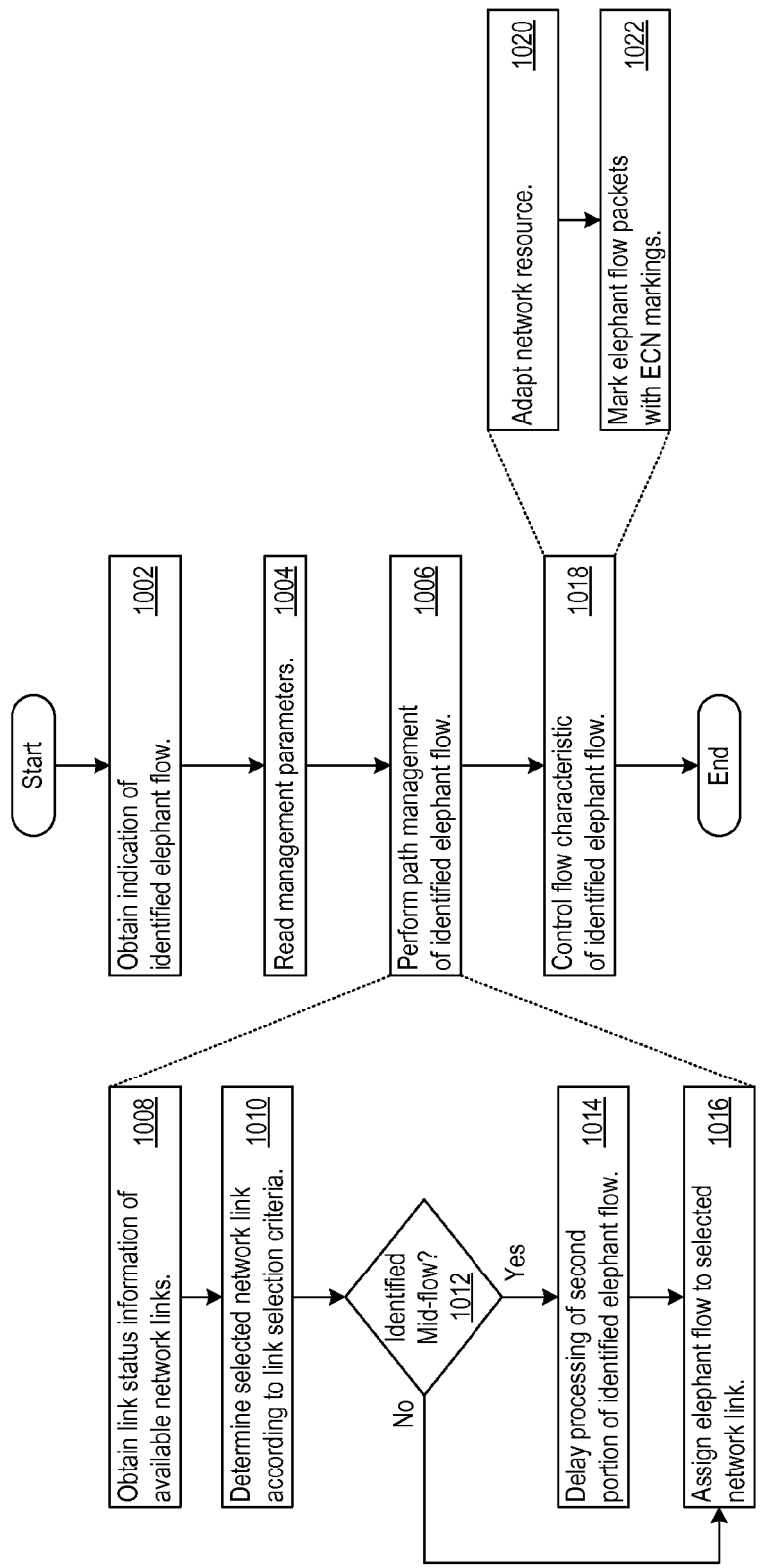
FIG. 10 shows an example of logic for managing one or more elephant flows.

FIG. 10 shows an example of logic 1000 that the elephant flow management logic 702 may implement to manage one or more elephant flows. The elephant flow management logic 702 may implement the logic 1000 as hardware, firmware, or software. The elephant flow management logic 702 obtains an indication of an identified elephant flow (1002). As examples, the elephant flow management logic 702 may access an elephant flow cache 230 to access an entry specifying identifying information of identified elephant flows. The elephant flow management logic 702 may also identify an elephant flow in received network data in any of the ways discussed above in accordance with the elephant flow identification logic 202.

The elephant flow management logic 702 reads the management parameters 712 (1002) and manages the path the identified elephant flow is communicated across (1006). In doing so, the elephant flow management logic 702 may obtain link status information 714 for available network links (1008) and determine a selected link from among the available links according to link selection criteria specified by the management parameters 712 (1010). When the identified elephant flow was discovered mid flow and a first portion (e.g., packets) of the elephant flow was already assigned to another network link, the elephant flow management logic 702 delays processing of a second portion (e.g., subsequent packets) of the elephant flow (1014). The elephant flow management logic 702 may delay processing of the second portion of the elephant flow through flow control at ingress logic receiving the elephant flow. The delay may correspond to a skew between communication of the first portion of the elephant flow through the previously assigned network link and communication of the second portion of the elephant flow through the selected network link so the packets of the elephant flow are received in order at the destination. Whether the identified elephant flow was discovered mid-flow or not, the elephant flow management logic 702 assigns the identified elephant flow to the selected network link (1016) by routing incoming packets of the identified elephant flow for communication through the selected network link.

The elephant flow management logic 702 can additionally or alternatively control flow characteristics of the identified elephant flow (1018). In doing so, the elephant flow logic 702 may adapt a network resource in the network device to handle packet data of the identified elephant flow (1020) in any of the ways described above. The elephant flow management logic 702 can allocate an elephant flow queue 810 dedicated (e.g., solely) to buffer packet data for the identified elephant flow. The elephant flow management logic 702 can also configure the elephant flow queue 810 according to the management parameters 712, allowing the elephant flow management logic 702 to control, as examples, consumed bandwidth, drop rate, or other characteristics of the identified elephant flow. As another flow control measure, the elephant flow management logic 702 can mark packets in the identified elephant flow with ECN markings as well (1022).

The elephant flow management logic 702 may perform any of the above described elephant flow management processes or configurations for some or all of the elephant flows identified by a network device, e.g., for each elephant flow identified by the elephant flow cache 230 or upon identification by the elephant flow identification logic 202. While the discussion above focused on management of a single elephant flow, the elephant flow management logic 702 may similarly manage multiple elephant flows, either independently or in combination. By independently managing flow characteristics and a communication path of different elephant flows, the elephant flow management logic 702 provides fine-grained control over individual elephant flows. As examples, the elephant flow management logic 702 may independently and configure network resource characteristics of respective network resources assigned to different elephant flows. Variance in elephant flow management may be specified through the management parameters 712, including on an flow type basis (e.g., application-specific basis), according to user input, on a per-port, per-tile, per-blade, per-device, per-network basis, and more.

As one example of variance in elephant flow management, the elephant flow management logic 702 may analyze packet data to determine that it has been generated by a particular application. The elephant flow management logic 702 may then perform any of the management techniques or processing based on the particular application that generated the packet. For example, the elephant flow management logic 702 may prioritize an advertisement application elephant flow by allocating a queue with the highest priority to buffer the advertisement application elephant flow, while a search application elephant flow might be allocated a lower priority queue, etc. The elephant flow management logic 702 may effectuate similar prioritization based on a particular application when determining a selected network link to assign an elephant flow, or for other management actions.

Figure 11:
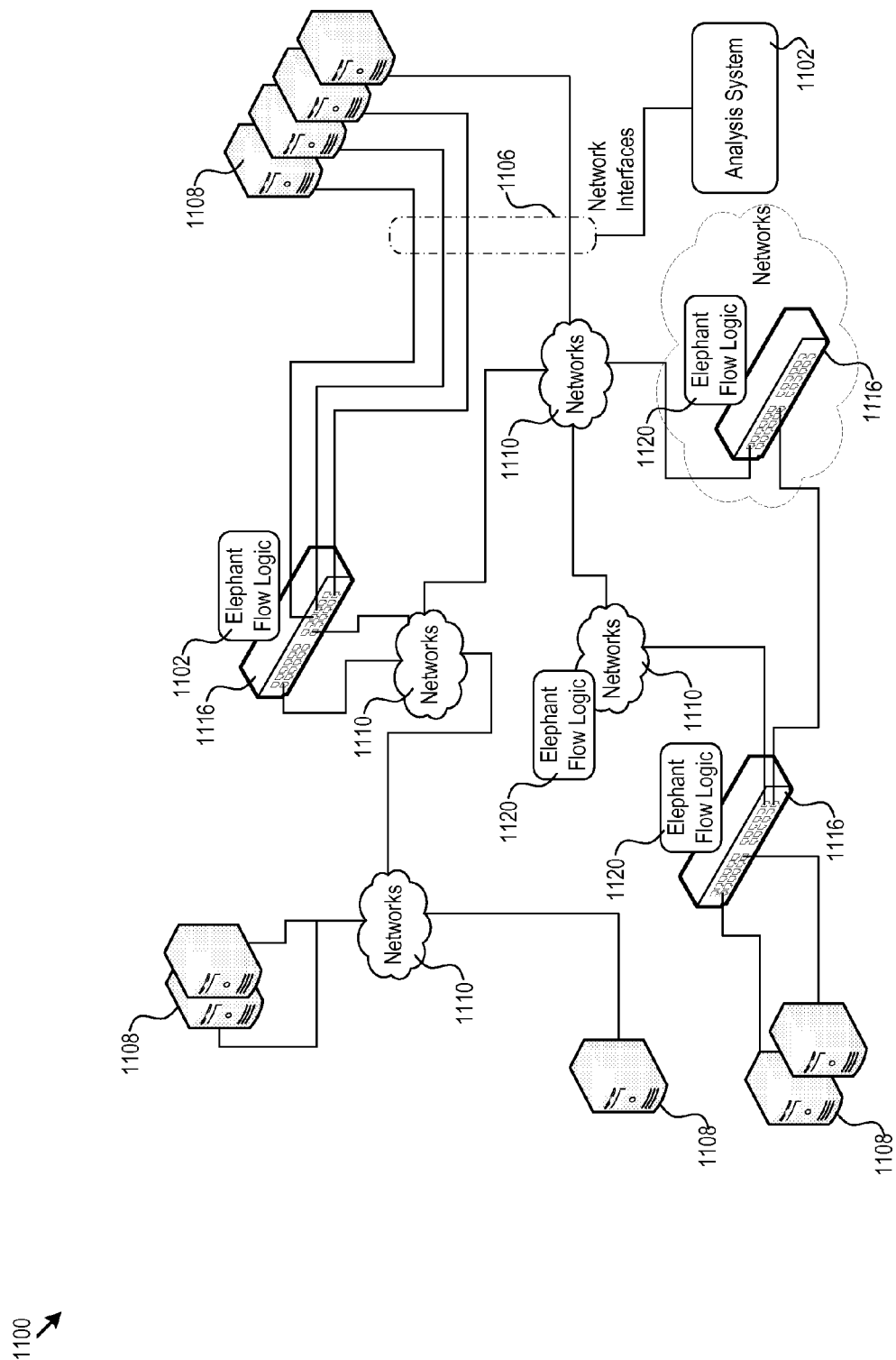
FIG. 11 shows an example of a communication system that includes an analysis system.

FIG. 11 shows an example communication system 1100 that includes an analysis system 1102. The analysis system 1102 can track elephant flows communicated across the communication system 1100. The communication system 110 includes edge devices 1108. The edge devices 1108 may be any type of computing device, including as examples application servers, data servers, personal computing devices (e.g., laptops, computers, mobile phones, personal digital assistants, tablet devices, etc.). The communication system 1100 includes intermediate networks 1110, which may include any number of intermediate network devices. The communication system 1100 also includes switches 1116.

At various points in the communication system 1100, elephant flow logic 1120 is present, which may include elephant flow identification logic 202, elephant flow management logic 702, or any other logic or functionality as described above. In the example shown in FIG. 11, the switches 1116 include elephant flow logic 1120. The networks 11010 also include elephant flow logic 1120, which may be present inside of any switch, router, or other network device in the networks 1110.

The analysis system 1102 can collect elephant flow statistics from devices in the communication system 1110 with elephant flow logic 1120. Any number and type of network interfaces 1106 may be present through which the analysis system 1102 samples and collects elephant flow statistics. Elephant flow statistics may be tracked according by the devices with elephant flow logic 1120 and include, as examples, elephant data with respect to elephant flow queue behavior, utilization, link status, drop rates, ECN marking frequency, packet attributes of identified elephant flows, number of elephant flows, percentage of bandwidth consumed by elephant flows, and any other data related to elephant flows communicated through the communication network 1100.

Figure 12:
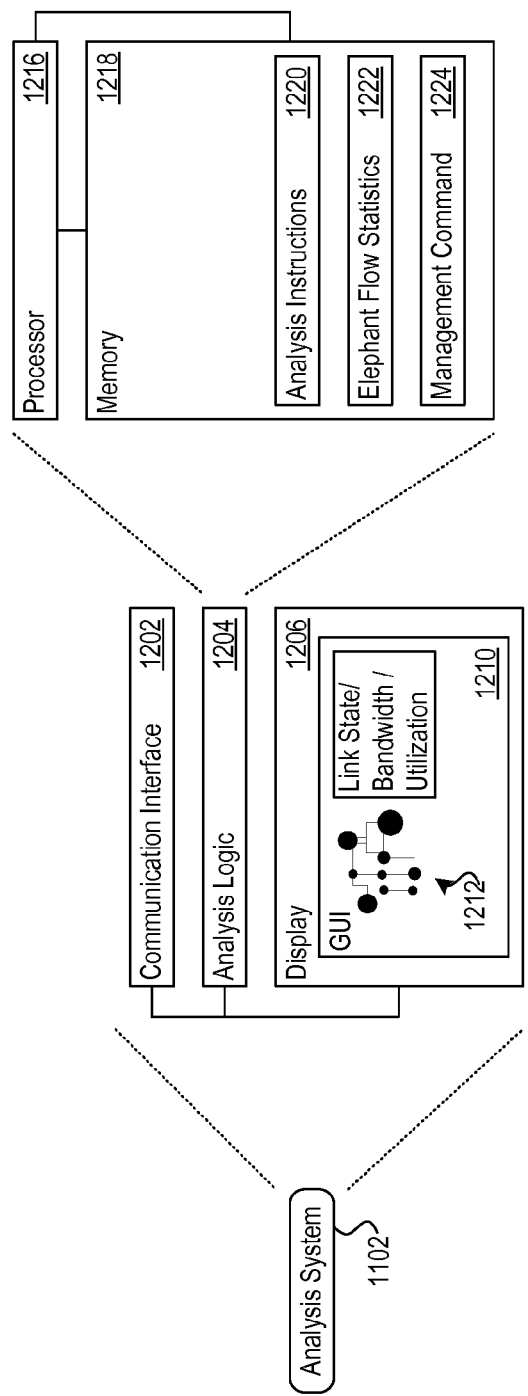
FIG. 12 shows an example analysis system.

FIG. 12 shows an example implementation of an analysis system 1102. The analysis system 1102 includes a communication interface 1202, analysis logic 1204, and a user interface 1206. The communication interface 1202 may include one or more Ethernet ports, or any other type of wired or wireless communication interface. The communication interface 1202 receives elephant flow statistics tracked by one or more network devices that include elephant flow logic 1120.

The user interface 1206 may display, for example, a graphical user interface (GUI) 1210. The user interface 1206 may accept elephant flow identification or management parameters, elephant flow analysis commands, and display through the GUI 1210 any type of elephant flow management interface 1212, such as management dashboards. The elephant flow management interface 1212 may visualize, as just a few examples, utilization, congestion, throughput, line rates, or other information attributed to elephant flows handled by any network device, set of network devices, either individually or aggregated across or any parts of the communication system. The elephant flow statistics drives the visualization and analysis, which the analysis logic 1204 may carry out.

The analysis logic 1204 may be implemented in hardware, software, or both. In one implementation, the analysis logic 1204 includes one or more processors 1216 and memories 1218. The memory 1218 may store analysis instructions 1220 (e.g., program instructions) for execution by the processor 1216. The memory 1218 may also hold the elephant flow statistics received at the communication interface 1202.

As will be described in more detail below, the analysis instructions 1220 may generate management commands 1224. The analysis system 1102 may send the management commands 1224 to any network device (not just network devices that provided elephant flow statistics). The management commands 924 may, as just a few examples: cause a change in the way that elephant flow packets are processed in any network device, change the way elephant flow packets are routed through the network, request further elephant flow information from the network device, adjust any of the identification parameters 212 or management parameters 712, trigger identification of an elephant flow, adjust configuration of a network resource such as an elephant flow queue 810, adjust elephant flow path management functionality or cause any other adaptation.

The analysis system 1102 generates user interfaces that help understand, in detail and at very granular levels, the operation of the communication system through which packets of one or more elephant flows are communicated. The analysis system 1102 may, either automatically, or under operator control, tune any of the network devices using the elephant flow statistics 1222 as a feedback mechanism. The tuning may be done in real time, or in response to operator input, and be independent of or in combination with elephant flow identification and management performed by the elephant flow logic 1120 on a network device. The tuning may be dynamic, changing over time to meet desired service levels (e.g., to consistently meet latency requirements specified by customers). Thus, the elephant flow analysis capabilities provide additional information for existing data centers to address the impact of elephant flows, and provide deep insight into even individual network device (e.g., switch) performance when handling elephant flows or otherwise, in a fine grained manner.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The elephant flow logic described above, including the elephant flow identification logic 202 and elephant flow management logic 702, may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the systems and methods have been described, it will be apparent to those of ordinary skill in the art that many more embodiments and implementations are possible within the scope of the systems and methods. Accordingly, the systems and methods are not to be restricted except in light of the attached claims and their equivalents.

What is claimed is:

1. A method comprising:
   in a network device:
   obtaining an application identification criterion for a specific application;
   receiving network flow data in the network device;
   applying the application identification criterion to the network flow data to identify application specific network flow data arising from the specific application; and
   performing a jumbo flow analysis on the application specific network flow data to determine whether a jumbo network flow is present for that particular application, the jumbo flow analysis comprising:
   identifying a specific macroflow in the application specific network flow data, the specific macroflow comprising multiple component dataflows;
   disaggregating the specific macroflow into the multiple component dataflows; and
   identifying, as the jumbo network flow, a specific dataflow among the multiple component dataflows that meets a jumbo network flow identification criterion.

2. The method of claim 1, where identifying a specific macroflow comprises:
   separating the application specific network flow data into multiple macroflows; and
   determining, from among the macroflows, the specfic macroflow as a macroflow with highest data rate among the multiple macroflows.

3. The method of claim 2, where separating comprises:
   applying, to a packet in the application specific network flow data, a first hash function; and
   determining a macroflow assignment for the packet according to output of the first hash function for the packet.

4. The method of claim 3, further comprising:
   incrementing a first packet count responsive to the macroflow assignment after the hash function is applied.

5. The method of claim 4, where determining the specific macroflow comprises:

determining that the first packet count has exceeded a second packet count, the second packet count incremented responsive to a different macroflow assignment.

6. The method of claim 4, further comprising:
decrementing the first packet count when a specified decrement criterion is met.

7. The method of claim 1, where the application identification criterion comprises inclusion of an application specific marking within the network data flow.

8. A device comprising:
an elephant flow cache storing:
a first elephant flow;
elephant flow identification circuitry operable to:
obtain first network data;
extract packets belonging to the first elephant flow from the network data to obtain second network data not including the packets belonging to the first elephant flow;
filter the second network data according to a predetermined application specific criterion to obtain filtered network data;
determine a second elephant flow from the filtered network data;
add the second elephant flow to the elephant flow cache; and
determine a selected elephant flow by:
disaggregating the filtered network data into multiple macroflows according to a macroflow criterion;
identify a top macroflow from among the multiple macroflows;
disaggregate the top macroflow into multiple microflows according to a microflow criterion; and
identify a top microflow from among the multiple microflows as the selected elephant flow.

9. The device of claim 8, where the elephant flow identification circuitry is operable to disaggregate the filtered network data by applying a macroflow hash function to the filtered network data.

10. The device of claim 9, where the elephant flow identification circuitry is operable to disaggregate the top macroflow by applying a microflow hash function to the top macroflow.

11. The device of claim 10, where the macroflow hash function is orthogonal to the microflow hash function.

12. The device of claim 8, where the elephant flow identification circuitry is operable to disaggregate the top macroflow based on a predetermined packet fields.

13. The device of claim 12, where the packet fields comprise a source address, a destination address, a source port, a destination port, protocol number of a first top macroflow packet, or any combination thereof.

14. The device of claim 8, where the elephant flow identification circuitry is configured to filter the second network data according to a predetermined application specific criterion by filtering the second network data according to an application specific marking within the second network data.

15. A device comprising:
a memory comprising:
identification parameters;
a macroflow cache; and
a microflow cache; and
elephant flow identification circuitry in communication with the memory, the elephant flow identification circuitry operable to:
read the identification parameters to obtain an application specific criterion;
filter network data according to the application specific criterion to obtain filtered network data;
disaggregate the filtered network data into multiple macroflows and store the multiple macroflows in the macroflow cache;
identify a top macroflow from among the multiple macroflows;
disaggregate the top macroflow into multiple microflows and store the multiple microflows in the microflow cache; and
identify a top microflow from among the multiple microflows as a selected elephant flow.

16. The device of claim 15, where the macroflow cache is implemented as a bubble-up cache, and where the elephant flow identification circuitry is operable to identify the top macroflow as a macroflow that is first in the macroflow cache.

17. The device of claim 15, where the microflow cache is implemented as a bubble-up cache, and where the elephant flow identification circuitry is operable to identify the top microflow as a microflow that is first in the microflow cache.

18. The device of claim 15, where the elephant flow identification circuitry is operable to disaggregate the filtered network data by applying a macroflow hash function to the filtered network data.

19. The device of claim 18, where the elephant flow identification circuitry is operable to disaggregate the top macroflow by applying a microflow hash function to the top macroflow.

20. The device of claim 19, where the macroflow hash function is orthogonal to the microflow hash function.

* * * * *